United States Patent
Weinmeister

(10) Patent No.: US 7,653,546 B2
(45) Date of Patent: Jan. 26, 2010

(54) METHOD AND SYSTEM FOR EFFICIENT VOICE-BASED PROGRAMMING

(75) Inventor: Karl J. Weinmeister, Austin, TX (US)

(73) Assignee: Nuance Communications, Inc., Burlingon, MA (US)

( * ) Notice: Subject to any disclaimer, the term of this patent is extended or adjusted under 35 U.S.C. 154(b) by 772 days.

(21) Appl. No.: 10/992,516

(22) Filed: Nov. 18, 2004

(65) Prior Publication Data

US 2006/0106608 A1    May 18, 2006

(51) Int. Cl.
*G10L 21/00* (2006.01)
*G10L 15/00* (2006.01)
*G06F 9/44* (2006.01)

(52) U.S. Cl. .................. 704/275; 704/231; 704/270; 717/100; 717/106

(58) Field of Classification Search .................. None
See application file for complete search history.

(56) References Cited

U.S. PATENT DOCUMENTS

| | | | | |
|---|---|---|---|---|
| 5,448,740 | A | 9/1995 | Kiri et al. | 395/700 |
| 5,485,601 | A | 1/1996 | Ching | 395/500 |
| 6,282,699 | B1 | 8/2001 | Zhang et al. | 717/2 |
| 7,512,936 | B2 * | 3/2009 | Schneider et al. | 717/136 |
| 2003/0023953 | A1 | 1/2003 | Lucassen et al. | 717/106 |
| 2003/0088858 | A1 | 5/2003 | Minerley | 717/141 |
| 2003/0110040 | A1 * | 6/2003 | Holland et al. | 704/275 |
| 2003/0208743 | A1 | 11/2003 | Chong et al. | 717/106 |
| 2004/0153995 | A1 * | 8/2004 | Polonovski | 717/113 |
| 2005/0114832 | A1 * | 5/2005 | Manu | 717/106 |

OTHER PUBLICATIONS

Arnold S. et al. "Programming by voice, VocalProgramming", ASSETS pp. 149-155, Nov. 13, 2000.*
Nygryn, P. et al. "Dialogue generation of program source codes" Text, Speech and Dialogue, 4th Int. Conf. pp. 388-395, 2001.*
Desilets, A. "Voicegrip: a tool for programming-by-voice" Int. Journal of Speech Technology, pp. 103-116, 2001.*
Begel, A. "Spoken Language Support for Software Development" IEEE Symposium on Visual Languages and Human Centric Computing, Sep. 2004.*

* cited by examiner

*Primary Examiner*—Matthew J Sked
(74) *Attorney, Agent, or Firm*—Wolf, Greenfield & Sacks, P.C.

(57) ABSTRACT

Provided is a system and method for creating program code via voice input. The method includes providing a client application configured to compare a voice input to a grammar specified in a document; mapping a plurality of commands specified in the grammar to programming language commands; and enhancing the mapped programming language commands to enable compiling. The enhancing can include creating programming code by inserting at least implicit parentheses, punctuation, and default variable values. The programming language commands can be associated with Java or another language. The document can be a VoiceXML file that can be altered to permit a number of different programming language. A voice programming system includes a receiver to receive voice commands; a voice programming processor configured to process the voice commands to create code; and an enhancement block configured to alter the code into compilable code. The enhancement block inserts implicit parentheses, punctuation and variables appropriate for a predetermined code.

20 Claims, 4 Drawing Sheets

METHOD AND SYSTEM FOR EFFICIENT VOICE-BASED PROGRAMMING

TECHNICAL FIELD

The present invention relates generally to programming code and, more specifically, to a system and method for providing voice-based programming.

BACKGROUND OF THE INVENTION

Computer programming began with cumbersome code entry. Even in the 1980's typical code entry was done on punch cards that were fed to a card reader. Later developments allowed keyboard entry of computer code. Further developments included applications for compilers that provided programmers with debugging tools and allowed object oriented programming. Efficiency tools for helping programmers develop code quickly using modules and the like were also developed. Most programming tools depend on a programmer knowing how to use the tools available to them and require keyboard entry. A programmer incapable of using a keyboard entry system for health reasons or due to a handicap or the like can be a detriment to a company's success. Being able to visualize what is programmed is also important to a programmer. Thus, use of hands and eyes is required by current programming applications to quickly generate code. Such requirements can hinder otherwise talented programmers from generating code.

What is needed is a system and method for allowing programmers incapable of using keyboard entry systems to perform computer programming.

SUMMARY OF THE INVENTION

Provided is a system and method for accepting voice commands and outputting computer code. The system includes a voice programming processor capable of accepting voice commands, the voice programming processor including a grammar configured to be compared to a voice input. The voice programming processor is configured to use a VoiceXML document to map commands to a programming code. The voice programming processor further includes a code completion engine configured to alter the mapped programmed code into a predetermined programming language by providing implicit parentheses, punctuation, variable values and the like. Thus, the predetermined programming language can be one of a plurality of programming languages as long as the code completion engine has knowledge concerning the appropriate punctuation and variables for the language.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE FIGURES

Figure 1:
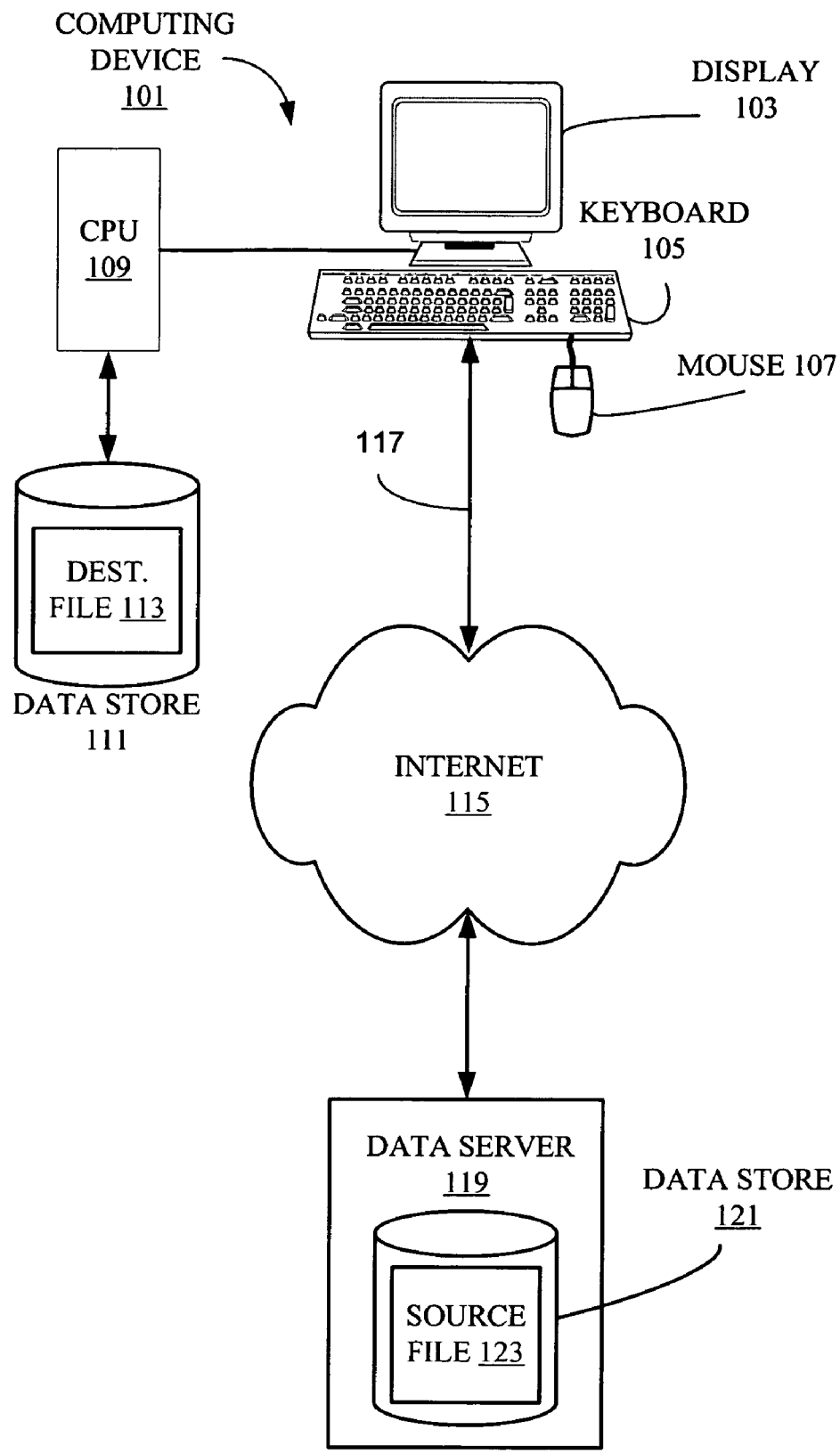
FIG. 1 is a block diagram of an exemplary system architecture that supports the claimed subject matter.

Although described with particular reference to programming languages, the system and method of the current invention can be implemented for any interpreted language, such as a spoken language and the like. FIG. 1 illustrates an exemplary architecture 100 in which the system according to the present invention is implemented. Those with skill in the computing arts will recognize that the disclosed embodiments have relevance to a wide variety of applications and architectures in addition to those described below. In addition, the functionality of the present invention can be implemented in software, hardware, or a combination of software and hardware. The hardware portion can be implemented using specialized logic; the software portion can be stored in a memory or recording medium and executed by a suitable instruction execution system such as a microprocessor.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

FIG. 1 is a block diagram of an exemplary system architecture 100 that supports the claimed subject matter. System 100 includes a computing device 101, which in this example is a personal computer (PC). Attached to PC 101 are a display 103, a keyboard 105, and a mouse 107. Display 103, keyboard 105 and mouse 107 provide a user with means to interact with PC 101. Also included in PC 101 are a central processing unit (CPU) 109 and a recording medium, or data store 111. Those with skill in the computing arts should be familiar with PC 101 and related components 103, 105, 107, 109 and 111.

PC 101 is connected to the Internet 115 via a connection 117. Also coupled to Internet 115 is a data server 119 with a data store 121. A user of PC 101 can access various information sources, such as a source file 123 on data store 119, via Internet 115.

PC 101 can be configured to be a Web server that processes requests from a client application or can be configured as a client that sends requests to a connected Web server.

According to an embodiment, PC 101 can be configured as a Web server that includes a VoiceXML Interpreter. More particularly, referring to FIG. 2, according to an embodiment, PC 101 can be a server that enables programmers to use voice commands to produce VoiceXML documents in reply, which are processed by the VoiceXML interpreter. Thus, a server 210 can include a VoiceXML interpreter context 220 and a VoiceXML interpreter 230 that can operate to enable a programmer to create code by voice. For example, if a programming language is capable of interacting with an interactive voice response application, the VoiceXML interpreter and implementation platform 240 can generate events in response to user actions such as spoken code. Some of these events are acted upon by the VoiceXML interpreter itself, as specified by a VoiceXML document 250, while others are acted upon by the VoiceXML interpreter context 220. The VoiceXML interpreter 230 can thus interact with a document server 260 to both send a request 270 and receive documents 280.

Figure 2:
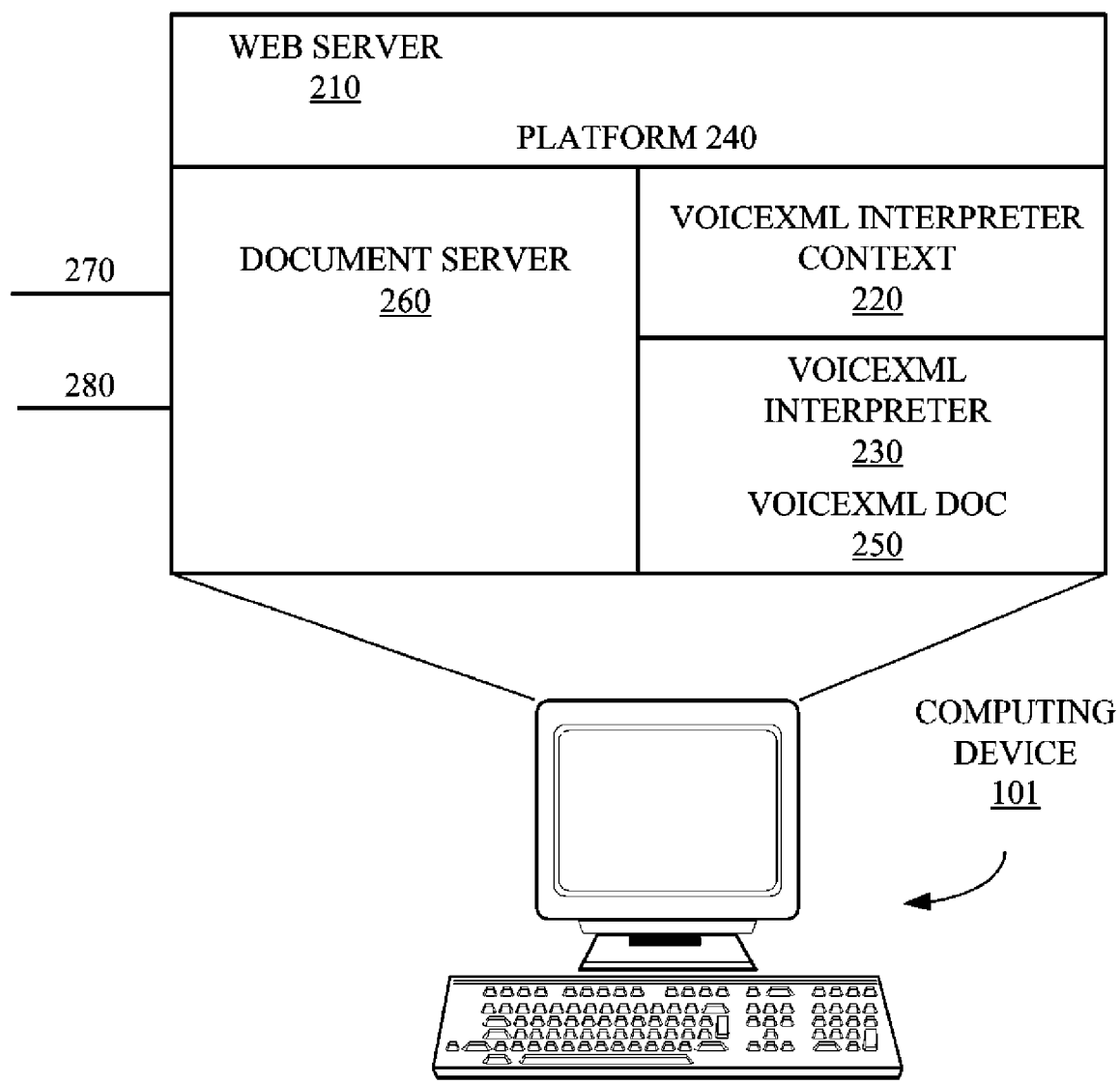
FIG. 2 is a block diagram of a VoiceXML system that supports the claimed subject matter.

VoiceXML is an XML application that allows content delivery to voice response applications, and frees authors of such applications from low-level programming and resource management. It enables integration of voice services with data services using a client-server paradigm as shown in FIG. 2. A voice service is viewed as a sequence of interaction dialogs between a user and an implementation platform. The dialogs are provided by document servers, which may be external to the implementation platform.

VoiceXML is a markup language that minimizes client/server interactions by specifying multiple interactions per document.

VoiceXML is a language that describes the human-machine interaction provided by voice response systems, and provides means for collecting character and/or spoken input, assigning the input results to document-defined request variables, and making decisions that affect the interpretation of documents written in the language. A document may be linked to other documents through Universal Resource Identifiers (URIs). The language promotes portability of services through abstraction of platform resources. The language accommodates platform diversity in supported audio file formats, speech grammar formats, and URI schemes. Producers of platforms may support various grammar formats, but VoiceXML requires a common grammar format, namely the XML Form of the W3C Speech Recognition Grammar Specification [SRGS], to facilitate interoperability. The language has well-defined semantics that preserves the author's intent regarding the behavior of interactions with the user. Client heuristics are not required to determine document element interpretation.

The language recognizes semantic interpretations from grammars and makes this information available to an application. General service logic, state management, dialog generation, and dialog sequencing are assumed to reside outside the document interpreter. The language provides ways to link documents using URIs, and also to submit data to server scripts using URIs.

The interpreter context is expected to acquire documents for the VoiceXML interpreter to act on. In some cases, the document request is generated by the interpretation of a VoiceXML document, while other requests are generated by the interpreter context in response to events outside the scope of the language. An implementation platform is required to detect and report character and/or spoken input simultaneously and to control input detection interval duration with a timer whose length is specified by a VoiceXML document.

A VoiceXML interpreter is capable of receiving speech recognition grammar data dynamically and is able to use speech grammar data in the XML Form of the W3C Speech Recognition Grammar Specification [SRGS]. A VoiceXML interpreter can be configured to receive speech recognition grammar data in the ABNF form of the W3C Speech Recognition Grammar Specification [SRGS], and may support other formats such as the JSpeech Grammar Format [JSGF] or proprietary formats. Some VoiceXML elements contain speech grammar data; others refer to speech grammar data through a URI. The speech recognizer can accommodate dynamic updates of the spoken input for which it is listening through either method of speech grammar data specification.

A VoiceXML document forms a conversational finite state machine. The user is always in one conversational state, or dialog, at a time. Each dialog determines the next dialog to transition to. Transitions are specified using URIs, which define the next document and dialog to use.

Figure 3:
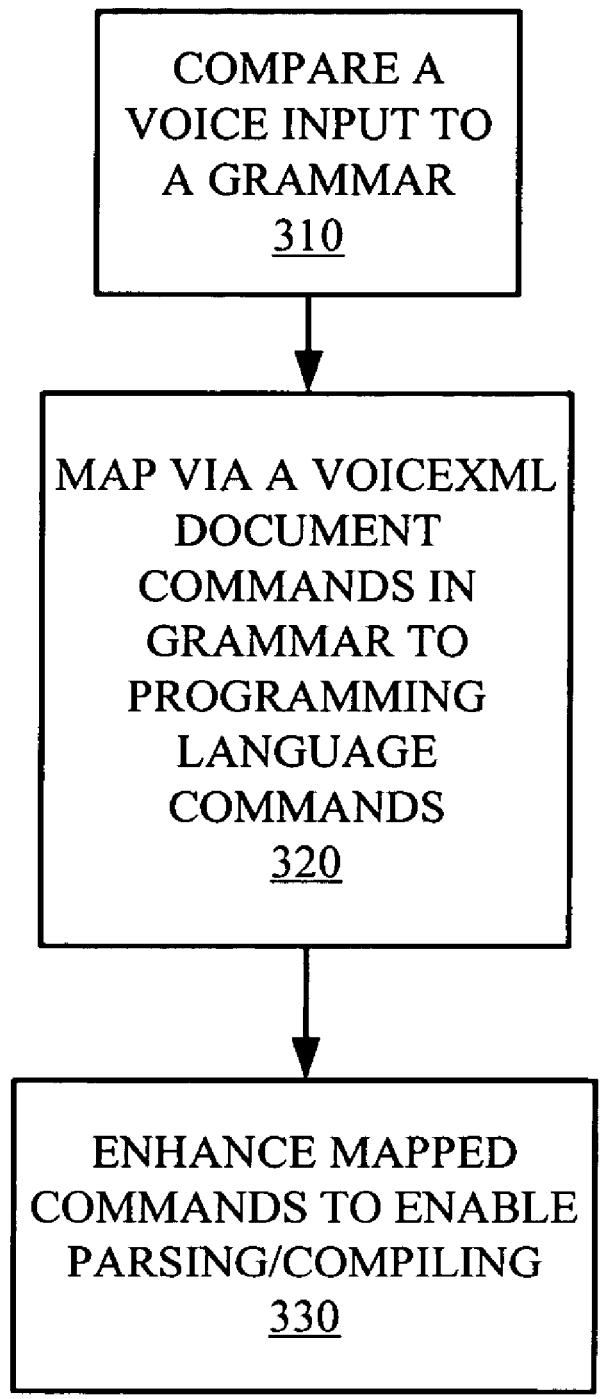
FIG. 3 is a flow diagram illustrating a method in accordance with an embodiment of the present invention.

Referring now to FIG. 3, a flow diagram illustrates a method for the invention using VoiceXML in combination with a grammar in a voice programming processor. More particularly, as shown in FIG. 3, block 310 provides for providing a client application configured to compare a voice input to a grammar specified in a VoiceXML document. Block 320 provides for mapping via the VoiceXML document a plurality of commands specified in the grammar to programming language commands. Block 330 provides for enhancing the mapped programming language commands to enable parsing or compiling. Specifically, in an embodiment, the method provides for filling out the programming language commands to create programming code by inserting implicit parentheses, punctuation, as well as default variable values. In one embodiment, the VoiceXML file can be altered to permit a number of different programming languages.

Figure 4:
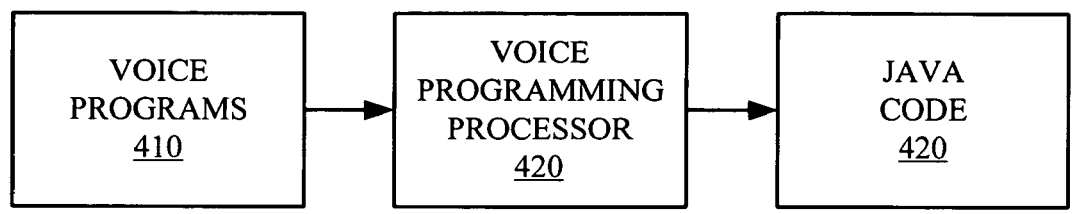
FIG. 4 is a block diagram of a voice processing system in accordance with an embodiment of the present invention.

Referring now to FIG. 4, block diagram illustrates how a voice programming processor could be configured according to an embodiment. As shown, the block diagram includes a voice programs block 410, which represents receiving simple voice commands. Block 410 is coupled to a voice programming processor block 420 which receives the voice commands and processing the voice commands into code, such as Java code. Block 420 is coupled to block 430, representing Java code with implicit parentheses, punctuation and variables.

The output code provided in block 430 will provide code appropriate for a compiler or other mechanism for using program code. Thus, if a programmer speaks, giving simple voice commands such as:

"new static class factorial; main input limit; int fact; for i 1 limit; increment fact by limit; endparen; out(fact); endmain"

The output code would be:

```
Public static class Factorial
{
Public static void main(int limit) {
    int fact=0
    for (i=0; i<limit; i++)
    {
        fact+=varnum;
    }
        System.out.println(fact);
}
```

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified steps performed in the same or a different order.

I claim:

1. A computer-implemented method for creating program code, the method comprising:
providing a client application configured to compare a voice input to a grammar specified in a document;
mapping a plurality of commands specified in the grammar to programming language commands; and
enhancing the mapped programming language commands to enable compiling;
wherein the enhancing includes creating programming code by inserting a default value for a variable specified by the voice input, wherein the default value is not specified by the voice input.

2. The method of claim 1, wherein the method is implemented on a smart card.

3. The method of claim 1, wherein the document is a VoiceXML file that can be altered to permit a number of different programming languages.

4. The method of claim 3, wherein the VoiceXML file includes code for creating programming code according to one of a plurality of programming languages.

5. The computer-implemented method of claim 1, wherein the enhancing includes creating programming code by further inserting implicit parentheses and/or punctuation.

6. A computer program product comprising:
   a memory;
   computer executable code, stored on the memory for execution on a processor, for:
      providing a client application configured to compare a voice input to a grammar specified in a document;
      mapping a plurality of commands specified in the grammar to programming language commands; and
      enhancing the mapped programming language commands to enable compiling;
      wherein the enhancing includes creating programming code by inserting a default value for a variable specified by the voice input, wherein the default value is not specified by the voice input.

7. The computer program product of claim 6 wherein the programming language commands are associated with one of a plurality of programming languages.

8. The computer program product of claim 6 wherein the programming language commands are Java programming language commands.

9. The computer program product of claim 6 wherein the document is a VoiceXML file.

10. The computer program product of claim 6 wherein the document is a VoiceXML file that includes code for creating programming code according to one of a plurality of programming languages.

11. The computer program product of claim 6, wherein the enhancing includes creating programming code by further inserting implicit parentheses and/or punctuation.

12. A voice programming system comprising a combination of hardware and software that implements:
   a receiver configured to receive voice commands;
   a voice programming processor coupled to the receiver, the voice programming processor configured to process the voice commands to create code; and
   an enhancement block coupled to the voice programming processor, the enhancement block configured to alter the code into compilable code;
   wherein the enhancement block inserts a default value for a variable specified by the voice commands, wherein the default value is not specified by the voice commands.

13. The voice programming system of claim 12 wherein the voice programming processor includes a VoiceXML document configured to process the voice commands.

14. The voice programming system of claim 12 wherein the programming language commands are associated with one of a plurality of programming languages.

15. The voice programming system of claim 12 wherein the programming language commands are Java programming language commands.

16. The voice programming system of claim 12 wherein a VoiceXML document functions as a conversational finite state machine to enable the voice input to be transformed into program code.

17. The voice programming system of claim 12 wherein the voice programming processor includes a VoiceXML document as part of an application to compare a voice input to a grammar specified by the VoiceXML document.

18. The voice programming system of claim 12 wherein the system is implemented on an application specific integrated circuit (ASIC).

19. The voice programming system of claim 12 wherein the system is implemented on a smart card.

20. The voice programming system of claim 12, wherein the enhancement block further inserts implicit parentheses and/or punctuation.

* * * * *

UNITED STATES PATENT AND TRADEMARK OFFICE
CERTIFICATE OF CORRECTION

PATENT NO.       : 7,653,546 B2                                    Page 1 of 1
APPLICATION NO.  : 10/992516
DATED            : January 26, 2010
INVENTOR(S)      : Karl J. Weinmeister It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1263 days.

Signed and Sealed this

Twenty-third Day of November, 2010

David J. Kappos
*Director of the United States Patent and Trademark Office*